May 6, 1930.                H. H. WAGNER ET AL                1,757,851
                             CHAIN APPLYING DEVICE
                          Filed Feb. 11, 1928        2 Sheets-Sheet 1

Henry H. Wagner and
Charles L. Wagner
INVENTORS

BY *Victor J. Evans*
ATTORNEY

WITNESS: *John Donovan*

May 6, 1930.    H. H. WAGNER ET AL    1,757,851
CHAIN APPLYING DEVICE
Filed Feb. 11, 1928    2 Sheets-Sheet 2
Fig. 3.
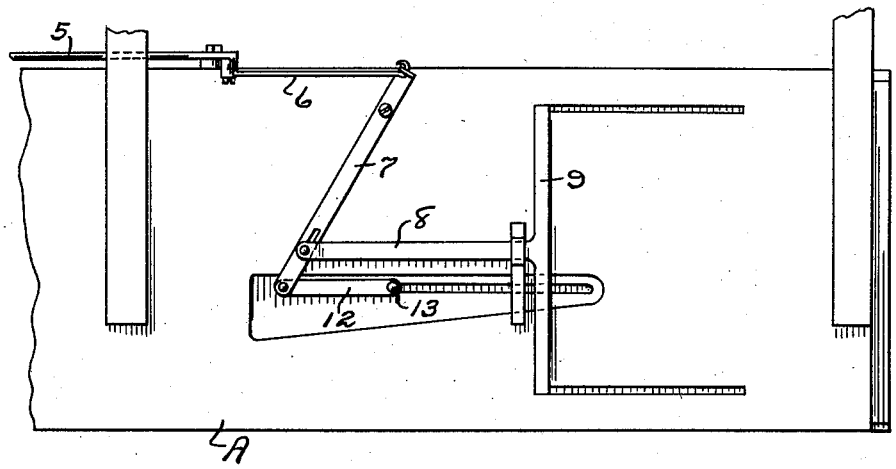
Fig. 4.    Fig. 5.
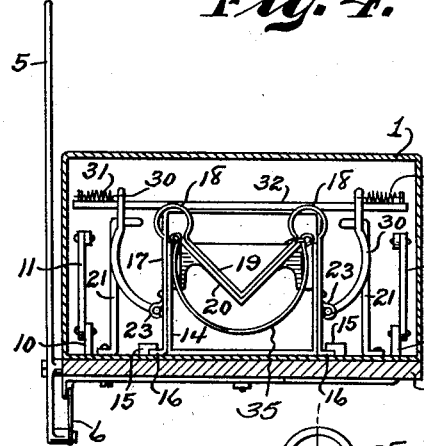    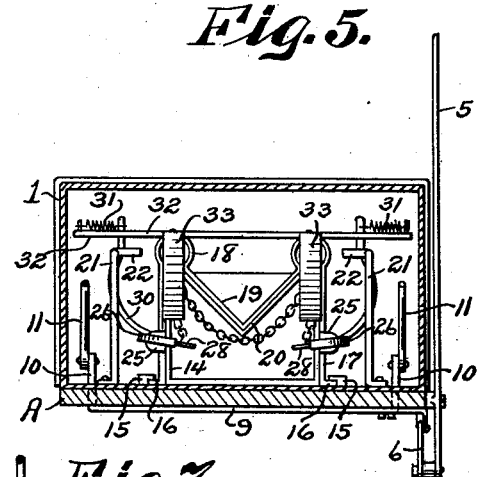
Fig. 6.    Fig. 7.
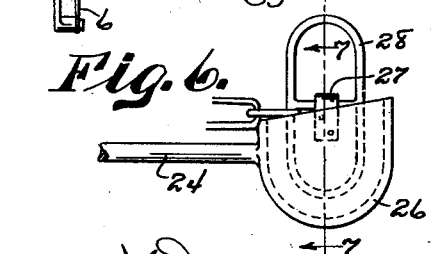
Henry H. Wagner and
Charles L. Wagner
INVENTORS
BY Victor J. Evans
ATTORNEY
WITNESS:

Patented May 6, 1930

1,757,851

UNITED STATES PATENT OFFICE

HENRY H. WAGNER AND CHARLES L. WAGNER, OF PICKERING, MISSOURI, ASSIGNORS OF ONE-THIRD TO JAMES L. NEAL, OF PICKERING, MISSOURI

CHAIN-APPLYING DEVICE

Application filed February 11, 1928. Serial No. 253,639½.

This invention relates to attachments for motor vehicles, and its general object is to provide a device for applying and securing anti-skid chains to vehicle wheels, by means actuated from the driver's seat with the result that the chains can be applied and secured to the wheels regardless of the condition of the roadway, at any time desired, in an easy and expeditious manner and with very little effort.

A further object of the invention is to provide a device for applying and securing antiskid chains to the tires of vehicle wheels, that is simple in construction, inexpensive to manufacture and efficient in operation and service.

This invention also consists in certain other features of construction and in the combination and arrangement of the several parts, to be hereinafter fully described, illustrated in the accompanying drawings and specifically pointed out in the appended claim.

In describing our invention in detail, reference will be had to the accompanying drawings wherein like characters denote like or corresponding parts throughout the several views, and in which:

Figure 1 is a vertical sectional view taken longitudinally through the device forming the subject matter of the present invention and showing parts in elevation with the device secured to the running board of a motor vehicle.

Figure 2 is a top plan view of the parts broken away and in elevation.

Figure 3 is a bottom plan view.

Figure 4 is a sectional view taken approximately on line 4—4 of Figure 1, looking in the direction of the arrows.

Figure 5 is a sectional view taken approximately on line 5—5 of Figure 1, looking in the direction of the arrows.

Figure 6 is a detail view of one of the end link carrying members which forms a part of the invention.

Figure 7 is a sectional view taken approximately on line 7—7 of Figure 6 looking in the direction of the arrows.

Referring to the drawings in detail, the letter A indicates a running board of a motor vehicle, which is adapted to have secured thereto one of the devices for applying antiskid chains to the rear tires of the vehicle. Each of the running boards of the vehicle has arranged thereon the device in a manner as suggested in Figure 1 of the drawings.

The device includes a housing 1 having its forward end closed by a pivoted door 2 and formed with the rear end and upon opposite sides thereof are flanges 3 arranged in spaced relation with respect to each other to provide guides to accommodate an arcuate shape door 4 mounted for slidable movement in the guides and to be controlled by a hand lever 5 which is arranged whereby it can be conveniently operated by the driver of the vehicle as will be readily apparent. The hand lever 5 is pivotally secured intermediate its ends to the running board A and has pivotally secured to its lower end a link 6 which is pivotally connected to a lever 7 fulcrumed to the bottom of the running board as shown in Figure 3. The lever 7 is provided with a slot for pivotally receiving one end of an arm 8 formed with and extending centrally from a substantially U-shaped member 9 having upright ends 10 passing through slots formed in the running board to receive one end of a pair of links 11 while the opposite ends of said links are secured to the arcuate shape door 4.

The lever 7 has pivotally secured to its end opposite its connection with the link 6, a link 12 which has secured thereto and rising therefrom a pin 13 fixedly secured to the bottom of a substantially rectangular casing 14 mounted for slidable movement in the housing 1.

Secured to the bottom of the housing 1 are spaced parallel guides 15 adapted to receive the oppositely turned outwardly arranged ends 16 of frames 17 which are secured to the casing 14 whereby the casing will be guided in its movement. The frames 17 are provided at their upper ends with rounded portions 18 and thence extend into substantially V-shaped formation as at 19 to support a trough 20 of like shape in cross section, in the casing in a manner to be elevated above the bottom thereof as best shown in Figures 4 and 5 of the drawings. The upper edges of the trough 20 are spaced from the upper edges of the side walls of the casing for the purpose of allowing the cross chains of an anti-skid chain to be passed therethrough and hung below the trough as best shown in Figure 5 of the drawings. The side chains are arranged in loop formation and supported by the trough as best shown in Figure 2.

Secured to the bottom of the housing upon opposite sides of the casing are guide members 21 having upper cam track portions 22 bent upon themselves to provide portions arranged at angles with respect to each other for a purpose which will be presently apparent.

Secured to the casing and to the side walls thereof are bearing clips 23 which have arranged therein rods 24 mounted for rotation in collars 25 secured adjacent the forward ends of the casing as best shown in Figure 1 of the drawings. These rods have formed with their forward ends relatively deep elongated cup members 26 which have secured thereto and rising from the upper edges thereof spring clamps 27 for detachably securing links 28 therein as best shown in Figure 6 of the drawings. The links 28 include transverse cross members which are received by the spring clamps 27, and the cross members provide eyes in the links 28. One of the eyes of the links receive one of the ends of the side chains while the other eyes are directed inwardly for a purpose which will be presently apparent. Fixed to the felly of each of the rear wheels and upon opposite sides thereof are hooks 29 adapted to receive the links 28, and in order to arrange the links 28 in the path of the hooks 29, the casing 14 is moved rearwardly through the medium of the hand lever 5 which also opens the arcuate shape door 4 to allow the casing to project slightly therethrough so that the links 28 will be received by the hooks 29. The casing 14 and the trough 20 are each provided with an arcuate shape end to follow the curvature of the tire. In order that the cup shaped members and the links 28 thereof will pass the bulged portion of the tire, when the cup shape member and links pass upon opposite sides of the tire, the rods 24 are provided with curved upright portions 30 arranged in contacting engagement with the track portions 22 of the guide members 21. These upright portions 30 are held in such engagement by coil springs 31 secured to the upper ends of the upright portions and the ends of a cross rod 32. It will be apparent that when the casing is moved rearwardly, the upright portions 30 will be guided by the track portions 22 which are so arranged that the cup members will be turned from their original position as shown in Figure 5 to a position whereby they will freely pass the sides of the tire, but will be turned back to their original position when the casing 14 reaches the end of its rearward travel for arranging the links 28 in the path of the hooks 29 which will be received in the outer loops of the links 28 and pull them from the cup shaped members as well as the chain from the casing.

The chain is guided in its movement from the casing and trough through the medium of spring fingers 33 having one of their ends secured to the rearward frame 17 and their forward ends provided with ears 34 arranged in the path of the side chains as clearly shown in Figure 1 of the drawings.

From the above description and disclosure of the drawings, it will be apparent that we have provided a device for applying anti-skid chains to vehicle wheel tires without requiring the driver to leave the seat of the vehicle, as when the lever 5 is moved forwardly such movement will simultaneously open the door 4 and move the casing rearwardly in its housing 1 for disposing the links 28 in a manner to be received by the hooks 29. Upon moving the vehicle forwardly, the hooks will pull the chain from the trough and casing. Formed with the ends of the cross chain opposite the links 28 is a spring clamp 35 which is received by the tire when the chain is disposed about the same, which results in the chain being fixed about the tire in a manner whereby it cannot be casually removed therefrom.

It is thought from the foregoing description that the advantages and novel features of our invention will be readily apparent.

We desire it to be understood that we may make changes in the construction and in the combination and arrangement of the several parts, provided that such changes fall within the scope of the appended claim.

What we claim is:

In a device for applying an anti-skid chain to the tire of a vehicle wheel, carrying means for said chain, end links on the side members of said chain and having inwardly extending eyes, rods mounted for rotation upon opposite sides of said carrying means, upright portions formed with one of the ends of said rods, cup-shaped members formed with the opposite ends thereof to accommodate the end links of the side members of the anti-skid chain, a cross rod resiliently connected to the upright portions to urge the cup-shaped members to their normal position, means for moving the carrying means, guide members, cam track portions formed with the guide members and arranged in the path of the upright portions to be engaged thereby when the carrying means is moved to rotate the rods for moving the cup-shape members to carry the end links of the side members around the bulged portion of the tire.

In testimony whereof we affix our signatures.

HENRY H. WAGNER.
CHAS. L. WAGNER.